United States Patent [19]

Doetsch et al.

[11] Patent Number: 4,681,748

[45] Date of Patent: Jul. 21, 1987

[54] SUPEROXIDIZED SODIUM PERBORATE

[75] Inventors: Werner Doetsch, Bad Hoenningen; Rudolf Siegel, Neuwied, both of Fed. Rep. of Germany

[73] Assignee: Peroxid-Chemie GmbH, Hoellriegelskreuth, Fed. Rep. of Germany

[21] Appl. No.: 828,244

[22] Filed: Feb. 11, 1986

[30] Foreign Application Priority Data

Feb. 15, 1985 [DE] Fed. Rep. of Germany ....... 3505158

[51] Int. Cl.⁴ ............................................. C01B 15/12
[52] U.S. Cl. .................................. 423/279; 423/281; 423/415 P
[58] Field of Search ..................... 423/281, 415 P, 279

[56] References Cited

U.S. PATENT DOCUMENTS

| 4,115,519 | 9/1978 | Brichard et al. | 423/279 |
| 4,185,960 | 1/1980 | Brichard et al. | 423/281 |
| 4,215,097 | 7/1980 | Brichard et al. | 423/279 |

*Primary Examiner*—John Doll
*Assistant Examiner*—Lori S. Freeman
*Attorney, Agent, or Firm*—Schwartz, Jeffery, Schwaab, Mack, Blumenthal & Evans

[57] ABSTRACT

Superoxidized sodium perborate with an active oxygen content of more than 16 wt. % and a specially adapted process for its preparation.

9 Claims, No Drawings

SUPEROXIDIZED SODIUM PERBORATE

BACKGROUND OF THE INVENTION

This invention relates to a superoxidized sodium perborate and to a process for its preparation.

Superoxidized sodium perborates (SOPB) are known products. German Offenlegungsschrift No. 28 11 554, discloses an SOPB which contains more than 17% by weight active oxygen and less than 1.4 atoms hydrogen per active oxygen atom. It is prepared by introducing metaborate solution and $H_2O_2$ in a molar ratio of $1:>1.2$ into a fluidized bed of previously introduced nuclei and evaporating the water contained in the aqueous solution. In this way, products are obtained which are evidently a mixture of different types of adducts of peroxyborate, as expressed by the suggested empirical formula:

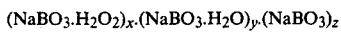

$(NaBO_3.H_2O_2)_x.(NaBO_3.H_2O)_y.(NaBO_3)_z$

Other SOPB are known from British Pat. No. 798,217 and French Published Application No. 1,590,710. The former are obtained by contact drying by passing solutions of $H_2O_2$ and metaborate over a hot surface at 100° to 130° C.; the latter are obtained by precipitation from an organic medium. Both SOPB are evidently adducts of $H_2O_2$ to peroxyborate.

SUMMARY OF THE INVENTION

It is the object of the invention to provide a new superoxidized perborate (SOPB).

Another object of the invention is to provide a specially adapted, simple process for preparing SOPB.

The objects of the invention are achieved in the first instance by providing sodium perborate with an active oxygen content of more than 16% by weight, characterized by the following characteristics of the IR spectrum (compressed KBr):

discrete bands within the range of approximately 3430, 2820, 1640, 1060 cm$^{-1}$;

missing individual bands at 850–870 cm$^{-1}$; and permeability ratio $D_{1060}:D_{3430}<1.0$, where D represents the permeability at the corresponding wavelength, measured in percent.

According to another aspect of the invention, the objects of the invention are achieved by providing a process for preparing sodium perborate comprising the steps of:

(a) preparing a solution or a suspension which contains Na metaborate and $H_2O_2$, the borate (calculated as $B_2O_3$) being present in a concentration of 90 to 130 g/l and the molar ratio of $H_2O_2$ to $B_2O_3$ being 2.2:1 to 8.0:1;

(b) drying the solution or suspension from step (a) in a spray dryer at an off-gas temperature of 55° to 120° C., and (c) recovering the resulting solid sodium perborate.

DETAILED DESCRIPTION OF PREFERRED EMBODIMENTS

The subject matter of the invention is a sodium perborate with an active oxygen content of more than 16% by weight characterized by the following characteristic properties of the IR spectrum (compressed KBr)

discrete bands within the range of approximately 3430, 2820, 1640, and 1060 cm$^{-1}$;

missing isolated bands at 850–870 cm$^{-1}$; and a permeability ratio $D_{1060}:D_{3430}<1.0$, where D is the permeability at the corresponding wavelength measured in percent.

The aforedescribed IR spectrum indicates the main bands characteristic of SOPB such as those usually obtained with the usual recording technique using compressed KBr. The wave numbers indicate the maxima of the bands which, in line with the usual range of variations, are reproducible with an accuracy of ±10 to 20 cm$^{-1}$.

The SOPB according to the invention exhibits no isolated bands within the range of 850–870 cm$^{-1}$, where only a weakly formed shoulder is recognizable, similar to the range of approximately 950 cm$^{-1}$. The "permeability ratio" parameter is determined by measuring the permeability (in percent) within the maximum of the bands at 1060 and/or 3430 cm$^{-1}$ and forming the corresponding quotient. In the compounds according to the invention, the permeability ratio is always less than 1.0, preferably less than 0.8.

A satisfactory SOPB according to the invention is also characterized by the following composition:

Na: 19–28 wt.%

B: 9–13.5, preferably 10–13 wt.%

$O_a$: 16–30, preferably 18–29.5, most preferably 22–29.5 wt.%

According to the invention, SOPB is also characterized by a BET surface area of less than 0.5 m$^2$/g. The BET method is used to measure the inner surface area of substrates. It is suitable to determine surface areas as small as 0.5 m$^2$/g fairly accurately. The product according to the invention is below this limit; an estimate gives surface areas of less than 0.1 m$^2$/g for the preferred products. Such sodium perborates are consequently practically free from pores.

Preferred products according to the invention are also characterized by one or more of the following properties:

They have an essentially spherical particle form.

The bulk density is in the range of about 0.2 to 0.4 g/ml.

The products are very finely divided and have a narrow particle size distribution. Fifty percent by weight, preferably 70 percent by weight, of the particles have a diameter within the range of 10–20 μm.

The products according to the invention are prepared by a specially adapted process which is characterized in that:

(a) a solution or suspension is prepared which contains sodium metaborate and $H_2O_2$, the borate (calculated as $B_2O_3$) being present in a concentration of 90 to 130 g/l, and the molar ratio of $H_2O_2$ to $B_2O_3$ being 2.2:1 to 8.0:1.

(b) the solution or suspension from step (a) is dried in a spray dryer at an off-gas temperature of 55° to 120° C., preferably at 60° to 95° C., and (c) the resulting sprayed substance is recovered.

The solution or suspension prepared in step (a) can be prepared in the known way by mixing sodium metaborate and $H_2O_2$.

The metaborate can consist of a metaborate solution which is obtained, for example, by causing boric acid to react with sodium hydroxide solution or, preferably, by dissolving solid metaborate in water. Another variation provides for solid metaborate to be introduced directly into $H_2O_2$.

The $H_2O_2$ is used in the form of aqueous solutions of $H_2O_2$ in a range of concentrations from 35 to 80%. It is, for example, possible to branch off crude $H_2O_2$ at approximately 35 to 45% concentration from $H_2O_2$ manufacture before distillation and to use it in the process according to the invention. Another variation provides for $H_2O_2$ distillate at approximately 70% concentration to be used.

The reactants are combined while taking the indicated parameters into consideration. In other words, the boron concentration (calculated as $B_2O_3$) in the resulting solution/suspension should amount to 90 to 130 g/l and $H_2O_2$ and $B_2O_3$ should form a molar ratio of 2.2:1 to 8.0:1, preferably of 2.2:1 to 5.2:1.

Under the conditions indicated it is possible to obtain either a solution or a suspension. The concentrations and molar ratios indicated are applicable in the case of a suspension to the values determined in the filtered stock solution. The term "suspension" should be understood to mean a solution containing solid particles. Preferably, the average diameter of the particles of a suspension is less than 10 μm. According to a preferred embodiment, a solution is prepared.

It is also possible to use solutions or suspensions containing the usual active oxygen stabilizers. Usual stabilizers include, for example, alkali metal or magnesium silicates, magnesium sulfate, phosphates, in particular metaphosphates, or organic stabilizers such as quinolinic acid, salicylic acid or dipicolinic acid (DPA), chelating agents such as 8-oxyquinoline or ethylenediaminotetraacetic acid (EDTA) or phosphonic acid derivatives such as aminotri-(alkylidene phosphonic acid), ethylenediaminotetra-(methylene phosphonic acid), alkylidene diphosphonic acids or salts thereof such as e.g. 1-hydroxyethane-1,1-diphosphonate (EHDP).

Stabilizers may be used in the usual concentrations of 2 to 30 g/l $H_2O_2$ (calculated as 100%).

No special measures need be taken regarding the temperature during the preparation of the solutions. For example, solutions and/or suspensions with temperatures in the range of 15° to 60° C., preferably from 40° to 50° C., can be prepared.

The solution or suspension resulting from step (a) is dried by known methods in a spray dryer. Either spray dryers with spray nozzles or spray dryers with rotating atomizing elements can be used. The stream of product and the temperature and/or the flow rate of the dry air are adjusted in such a way that an off-gas temperature of 55° to 120° C., preferably of 60° to 95° C., is attained.

The dry gas and the product can be separated by known methods. Fines can be recovered by means of a cyclone or an equivalent separating device and recycled to step (a).

Although it is known to obtain perborates by spray drying, only crystallized products with an active oxygen content of approximately 10.3% are obtained according to DE-PS No. 703 563. According to German Auslegeschrift No. 1 019 281, salt mixtures are atomized together with $H_2O_2$, but evidently only "normal" i.e. not superoxidized percompounds are obtained.

According to German Auslegeschrift No. 17 92 273 and German Offenlegungsschrift No. 18 14 744, percompound and metaborate are mixed directly before the spray nozzle and dried at off-gas temperatures of 40° to 100° C. Products are obtained with an active oxygen content of only approximately 15%, i.e. again "normal" perborates. These compounds exhibit a divergent IR spectrum since the bands at approximately 2,850 cm$^{-1}$ are missing and an isolated, intensive band appears at approximately 840 cm$^{-1}$.

The products according to the invention differ from all these known products by their increased active oxygen content. They are also X-ray amorphous.

Compared with known superoxidized perborates, such as those known from German Offenlegungsschrift No. 28 11 554, they also differ by the differential thermogram. Whereas the known products exhibit an endothermic peak in the region above 100° C., apart from the exothermic decomposition peak at approximately 150° C., the SOPB according to the invention exhibit no endothermic peak.

The SOPB's according to the invention are characterized by surprising properties. Their stability against conversion to the thermodynamically more stable peroxyborate trihydrate is higher than that of products prepared according to the prior art. Moreover, when introduced into water—e.g. for washing and/or bleaching purposes—their behavior differs from that of known sodium perborates in that—probably as a result of their being largely free from pores and due to the hardness of the particle surface—they remain suspended in water or even accumulate at the surface where they dissolve. Consequently, a loss of active oxygen can no longer occur, e.g. when used in a washing and/or bleaching agent, by perborate particles sinking on introduction into water into areas of the equipment from which they can be recycled only with difficulty by the effect of flow. This advantage is retained even if the perborate particles according to the invention are granulated to form granules having diameters of 100 to 300 μm. In view of the state of the art, these advantages were entirely unexpected.

The process for the preparation of the SOPB according to the invention is also characterized by advantages such as simple process control;

non-polluting, since neither liquid nor solid products are formed which require processing or disposal; and continuous process control.

The invention is illustrated in greater detail by the following examples which are not intended to restrict the scope of the invention.

EXAMPLES 1 TO 3

Seventy-two percent by weight $H_2O_2$ solution stabilized with 10 g magnesium sulfate and 5 ml EHDP per liter of $H_2O_2$ solution was metered with stirring into a reaction vessel containing sodium metaborate solution at 40° to 45° C. The resulting solution, which had the composition indicated in the table, was atomized in a spray dryer and dried at an off-gas temperature of 90° C. The end product was separated by means of a cyclone. It consisted of essentially spherical particles with an average particle size of 20 μm determined by measurement using scanning electron micrographs and had the composition indicated in the table. Example 3 was carried out by a continuous process according to the overall specification. In other words, metaborate solution and $H_2O_2$ solution were continuously metered into the preparation vessel and removed continuously at a rate corresponding to the rate of introduction into the spray dryer for spraying.

In the following table:

$B_2O_3$ represents the boron concentration of the solution prepared in the preparation vessel, calculated as g $B_2O_3$/l solution;

M represents the molar ratio of $H_2O_2:B_2O_3$ in the solution;

$T_a$ represents the temperature of the off-gas measured at the outlet of the spray dryer;

$O_a$ represents the active oxygen content determined by titration with permanganate;

B represents the boron content determined by AAS; and

Na represents the sodium content determined by X-ray fluorescence.

| Example | 1 | 2 | 3 |
|---|---|---|---|
| $B_2O_3$ | 99.4 | 94 | 94 |
| M | 2.42:1 | 3.46:1 | 3.46:1 |
| $O_a$ | 18.5 | 24.4 | 24.4 |
| B | 11.5 | 10.5 | 10.6 |
| Na | 22.3 | 20.1 | 20.0 |

The products of Examples 1 to 3 are also characterized by the following properties:

DTA curve:

Isotherm up to approximately 110° C., subsequently increasing, monotone increase up to the maximum of the exothermic decomposition peak at approximately 155° C.

IR Spectrum (compressed KBr):
(a) Isolated bands at

| Example | Wave number $cm^{-1}$ |
|---|---|
| 1 | 3428, 2810, 1644, 1062 |
| 2 | 3426, 2824, 1639, 1064 |
| 3 | 3432, 2828, 1636, 1060 |

(b) Missing isolated bands in the region of 850 to 870 $cm^{-1}$ (in each case there is only a weak shoulder at 856, 864 or 862 $cm^{-1}$);

(c) Permeability ratio $D_{1060}:D_{3430}$
Example 1: 0.69
Example 2: 0.66
Example 3: 0.66

NMR spectrum

The solid 11-boron-MAS-(1H)NMR spectrum at 96.3 MHz was measured. The standard (0 ppm) consisted of an aqueous solution of $H_3BO_3$. The product of Example 1 exhibited 3 signals with the following characteristics:

| Isotropic Displacement | Relative Intensity |
|---|---|
| −12.5 | 4.9 |
| −14.4 | 2.5 |
| −15.7 | 1.0 |

The strong signal at −16.9 characteristic of crystallized perborates (mono and trihydrate) is completely lacking. It can therefore be assumed that the SOPB according to the invention is a product with a modified structure, possibly a higher condensed perborate. However, the invention is not to be restricted by this interpretation.

EXAMPLE 4

In the course of a further series of tests, the work carried out was similar to that according to the general procedure of Example 1, but the off-gas temperature was varied. The resulting SOPB's had the following active oxygen contents though otherwise corresponding properties:

| Off-Gas Temperature (°C.) | Active Oxygen Content (%) |
|---|---|
| 65 | 18.3 |
| 70 | 18.3 |
| 75 | 18.6 |
| 85 | 18.8 |
| 95 | 18.8 |
| 105 | 18.3 |

EXAMPLE 5

A product according to the invention corresponding to the parameters of Example 1 was also obtained under the following conditions:

$B_2O_3$: 88.7
M: 5.02:1
$T_a$: 90° C.

The reaction product was characterized by the following analytical data:
$O_A$: 29.2 percent by weight
B: 9.73 percent by weight
Na: 19.0 percent by weight.

The foregoing description and examples have been set forth merely to illustrate the invention and are not intended to be limiting. Since modifications of the described embodiments incorporating the spirit and substance of the invention may occur to persons skilled in the art, the scope of the invention should be limited solely with respect to the appended claims and equivalents.

What is claimed is:

1. Sodium perborate with an active oxygen content of more than 16% by weight, characterized by the following characteristics of the IR spectrum (compressed KBr):

discrete bands within the range of approximately 3430, 2820, 1640, and 1060 $cm^{-1}$;
   missing individual bands at 850–870 $cm^{-1}$; and
   permeability ratio $D_{1060}:D_{3430}<1.0$, where D represents the permeability at the corresponding wavelength measured in percent.

2. Sodium perborate according to claim 1 characterized by the following composition:
   Na: 19–28 wt.%
   B: 9–13.5 wt.%
   $O_a$: 16–30 wt.%.

3. Sodium perborate according to claim 2, characterized by a boron content in the range from 10 to 13 weight percent.

4. Sodium perborate according to claim 2, characterized by an active oxygen content in the range from 18 to 29.5 weight percent.

5. Sodium perborate according to claim 4, wherein the active oxygen content is in the range from 22 to 29.5 weight percent.

6. Sodium perborate according to claim 1, characterized by a BET surface area of less than 0.5 $m^2/g$.

7. Sodium perborate according to claim 1, characterized by an essentially spherical particle form.

8. Sodium perborate according to claim 1, characterized in that 50% by weight of the particles have a particle diameter in the range from 10 to 20 μm.

9. Sodium perborate according to claim 7, characterized in that 70% by weight of the particles have a particle diameter in the range from 10 to 20 μm.

* * * * *